G. A. MacCORMACK.
FASTENER.
APPLICATION FILED NOV. 5, 1913.
1,104,204. Patented July 21, 1914.
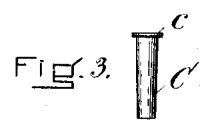
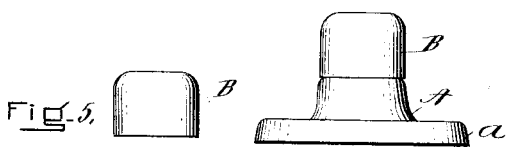
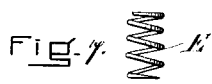
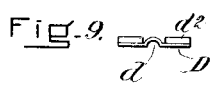
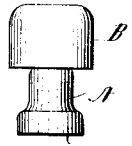
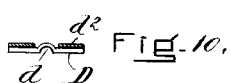
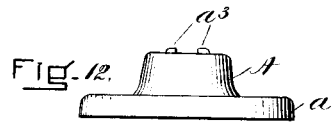
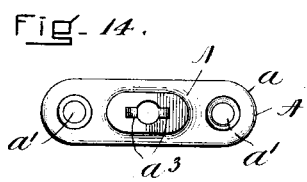
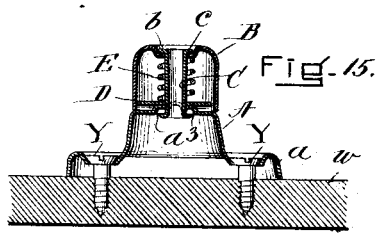
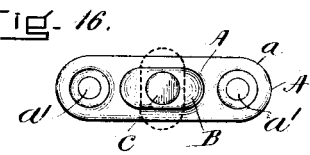
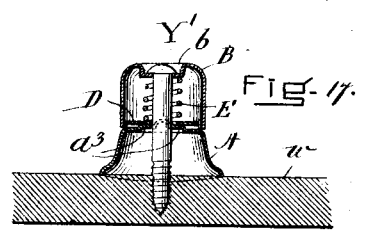
WITNESSES:
John Buckler
Josephine H. Ryan
INVENTOR:
George A. MacCormack
by Roberts & Cushman
Attorneys

UNITED STATES PATENT OFFICE.

GEORGE A. MacCORMACK, OF BOSTON, MASSACHUSETTS, ASSIGNOR TO UNITED STATES FASTENER COMPANY, OF BOSTON, MASSACHUSETTS, A CORPORATION OF MAINE.

FASTENER.

1,104,204.  Specification of Letters Patent.  Patented July 21, 1914.

Application filed November 5, 1913. Serial No. 799,388.

*To all whom it may concern:*

Be it known that I, GEORGE A. MACCORMACK, a citizen of the United States, and resident of Boston, in the county of Suffolk and State of Massachusetts, have invented new and useful Improvements in Fasteners, of which the following is a specification.

This invention relates to fasteners for carriage curtains and similar uses of the well known type comprising essentially a body portion adapted to be rigidly secured to a suitable support, and a rotatably mounted turn button adapted to pass through the curtain and thereafter to be turned and yieldingly locked at a right angle to said body portion. Fasteners of this type are usually, if not invariably, made of brass the turn button being made of a solid piece. Brass is an expensive material and the making of a solid brass turn button is a slow and laborious process. The fasteners are sold at a low price and the manufacturers' profit is consequently very small. Therefore, a construction which permits of a saving in the cost of materials and labor, is of very real importance; and it is the object of this invention to provide a fastener which may be more economically manufactured than the fasteners of this general type heretofore made.

Referring to the drawings, which illustrate certain embodiments of my invention,—Figure 1 is a side elevation of my improved fastener; Fig. 2 is an end elevation thereof, the turn button being turned at a right angle to the body portion; Figs. 3 and 4 are respectively a side elevation and sectional view of a pintle; Figs. 5 and 6 are respectively a side elevation and sectional view of the turn button shell; Figs. 7 and 8 are respectively a side elevation and sectional view of a spring; Figs. 9, 10 and 11 are respectively a side elevation, sectional view and plan view of a spring plate; Figs. 12, 13 and 14 are respectively a side elevation, sectional view and a plan view of the body portion of my improved fastener; Figs. 15 and 16 are respectively a sectional view and plan view of my improved fastener; and Fig. 17 is a sectional view of an alternative form.

A is the body portion of the fastener consisting of a hollow shell having a flaring base $a$ provided with screw holes $a'$ adapted to receive screws Y for securing the fastener to any suitable support, as W. The top of said body is substantially flat and provided with a central pintle opening $a^2$.

The turn button instead of being formed of solid brass, according to the construction heretofore commonly employed, consists of a hollow shell B (Fig. 6) preferably having an inset $b$ in its top and provided with a pintle opening $b'$.

The turn button B is rotatably mounted upon the body A by a pintle C which passes through said turn button and through the opening $a^2$ into the body A. Preferably, the said pintle C is a hollow rivet (Fig. 4) open at both ends (Figs. 4 and 15) and having a head $c$ which is adapted to rest within the inset $b$, the opposite end of the rivet being clenched inside the body A. Within said turn button B is a substantially flat spring plate D preferably of the shape shown in the drawings (Fig. 11) and having a central opening $d$ through which said pintle C passes. Said plate D is further provided with sockets or depresses $d^2$ and $d^3$ in its under side preferably arranged at right angles to one another as clearly shown in said Fig. 11. A spring E surrounding said pintle C and held between said plate D and the top of the button B serves yieldingly to hold said plate against the substantially flat top of said body portion A. Upon the said top of said body A and preferably formed integral therewith is a ridge or projection $a^3$ which is adapted to rest within either of said sockets $d^2$, $d^3$ and to coöperate therewith yieldingly to lock said turn button against rotation, as presently to be described.

The operation of the fastener is as follows: When the turn button is in what may be termed its normal position shown, for example, in Figs. 1 and 15, the ridge or projection $a^3$ upon the top of the body A rests within the socket $d^2$ of the plate D, thus preventing rotation of the button and yieldingly locking it in normal position. When now the turn button is rotated upon its pintle to secure the flap, the plate D is elevated and held in elevated position by the projection $a^3$ until the button reaches the position shown in Fig. 2, that is, a position at right angles to its normal position, whereupon the projection $a^3$ enters the socket $d^3$, thus releasing the spring E and permitting it to return the plate D to its position against the top of the body A again yieldingly locking the turn button. To return the turn button to normal position, it is again rotated upon its pintle in either direction, whereupon the spring plate D is again elevated and retained in elevated position until the projection $a^3$ reënters the socket $d^2$, thus releasing the spring E and relocking the button in its normal position.

It will be apparent that by replacing the solid brass turn button with a button consisting of a hollow shell in which all the moving, locking parts are housed, the cost of materials of the fastener is very much reduced. And not only is there a saving in the cost of material but also in time and labor. As I have said, the making of a solid brass turn button is a slow and laborious process. It takes a long time to blank the solid button and it must then be swaged into shape and a pintle hole drilled therethrough by hand. In a fastener made according to my invention the shells of the body and button are quickly and easily drawn and the other parts are readily made according to well understood practice in quantities and at small expense. This saving in materials and labor has proved in actual practice of real commercial importance; for when it is remembered that these fasteners are made and sold by the thousands, it will be apparent that the saving in the cost of production according to my invention amounts to a very large sum of money.

Fig. 15 shows the usual manner of attaching fasteners of this general type to a suitable support, i. e. by screws Y or the like which pass through openings $a'$ in the flaring base $a$ of the body portion A.

In Fig. 17 there is shown an alternative form of my invention wherein the usual flaring base is omitted from the body A and the screw or other appropriate fastening means Y' is passed through the hollow pintle C and body A into the support W. This method of securing the fastener to its support not only renders it more attractive and ornamental in appearance, but also results in further economy of manufacture in the saving of material through elimination of the usual flaring base upon the body portion.

I claim:

1. In a fastener, the combination with a body of a turn button rotatably mounted thereon, comprising a hollow shell and a plate yieldingly mounted therein, and complementary locking members on said body and said plate adapted yieldingly to lock said button against rotation.

2. In a fastener, the combination with a body provided with a projection, of a turn button rotatably mounted thereon comprising a hollow shell and a plate yieldingly mounted therein provided with sockets at right angles to the center of rotation of said button, said sockets adapted to coöperate with said projection yieldingly to lock said button against rotation.

3. In a fastener, the combination with a body provided with a projection, of a turn button rotatably mounted thereon comprising a hollow shell and a plate yieldingly mounted therein provided with sockets at right angles to each other, said sockets adapted to coöperate with said projection yieldingly to lock said button against rotation.

4. In a fastener, the combination with a body having a substantially flat top provided with a projection, of a turn button rotatably mounted thereon and comprising a hollow shell, a pintle passing through said shell into said body, a plate within said button provided with sockets at right angles to each other, a spring between said plate and the top of said shell, said sockets adapted to coöperate with said projection yieldingly to lock said button against rotation.

5. In a fastener, the combination with a body having a substantially flat top provided with a projection, of a turn button rotatably mounted thereon and comprising a hollow shell, a hollow pintle open at both ends passing through said shell into said body, a plate within said button provided with sockets at right angles to each other, a spring between said plate and the top of said shell, said sockets adapted to coöperate with said projection yieldingly to lock said button against rotation.

Signed by me at Boston, Massachusetts, this fourth day of November, 1913.

GEORGE A. MacCORMACK.

Witnesses:
G. A. HOLMES,
M. E. SPOTTSWOOD.